United States Patent [19]

Morimoto et al.

[11] Patent Number: 5,247,507
[45] Date of Patent: Sep. 21, 1993

[54] OPTICAL SCANNING SYSTEM FOR A SINUSOIDAL DATA TRACK

[75] Inventors: Yasuaki Morimoto, Sakurashi, Japan; Friedhelm Zucker, Mönchweiler; Christian Büchler, Villingen-Schwenningen, both of Fed. Rep. of Germany

[73] Assignee: Deutsche Thomson Brandt GmbH, Villingen-Schwenningen, Fed. Rep. of Germany

[21] Appl. No.: 880,940

[22] Filed: Jan. 16, 1992

[30] Foreign Application Priority Data

Jul. 14, 1989 [DE] Fed. Rep. of Germany ....... 3923330

[51] Int. Cl.$^5$ .............................................. G11B 7/00
[52] U.S. Cl. ................................. 369/111; 369/44.26; 369/44.37; 369/275.1
[58] Field of Search ................. 369/111, 44.26, 44.37, 369/275.1, 276, 59

[56] References Cited

U.S. PATENT DOCUMENTS 4,972,401 11/1990 Carasso et al. ........................ 369/59

FOREIGN PATENT DOCUMENTS 3410589 10/1984 Fed. Rep. of Germany .
3153674 11/1990 Fed. Rep. of Germany .

OTHER PUBLICATIONS

J. Nijof, An integrated approach to CD-players, Electronic Components & Application, vol. 6, No. 4, 1984, pp. 209-215.

Primary Examiner—Paul M. Dzierzynski
Assistant Examiner—Kim-Kwok Chu
Attorney, Agent, or Firm—J. S. Tripoli; E. P. Herrmann; L. L. Hallacher

[57] ABSTRACT

An optical scanning system for a compact disc having a sinusoidal data track radially meandering, at a selected frequency, about the axis of rotation of the disc includes a first laser beam for reading data from the data track. A +1 level laser beam and a −1 level laser beam respectively track the opposite edges of the data track and generate a tracking error signal. The +1 level laser beam and the −1 level laser beam are separated, with respect to the disc, by a distance equal to an odd integer multiple of one half the wavelength corresponding to the selected frequency. The +1 and −1 laser beams are not modulated by the sinusoidal data track and standard tracking circuitry can be used to track the data track.

1 Claim, 1 Drawing Sheet

OPTICAL SCANNING SYSTEM FOR A SINUSOIDAL DATA TRACK

This is a continuation of application PCT/EP 90/01039 filed Jun. 29, 1990 by Yasuaki Morimoto and Friedhelm Zucker.

The invention relates to an optical scanning system including a recording medium, such as a compact disc, and an optical scanning device which scans the recording medium according to a known triple beam scanning principle. The data tracks of the medium wobble, or meander, at a mean frequency and in a direction radial to the rotational axis of the disk.

DE-A 3153674 discloses a recording medium (disc) the data tracks of which wobble, or follow a sinusoidal path about a mean frequency. The advantage of this special form of data tracks lies in the fact that they are capable of carrying additional information, for example information concerning position. However, it is disadvantageous because the tracking of the sinusoidal data track is much more difficult than the tracking of a circular data track. Accordingly, the tracking regulator circuit is more complex than it would be without the sinusoidal data track.

DE-A 34 10 589 teaches the scanning of an optical recording medium using three light beams. The center beam is directed exactly onto the center of the track while the front and the back beam are displaced from the track center by the same distance but in different directions. The central beam is generated by a first laser while the front and the back beams are generated by a second laser at a different wavelength. The three beams are focused onto the disk by a prismatic beam splitter. The center beam is used to read the data from the optical recording medium while the front and the back beams serve for the tracking.

In Electronic Components & Applications, Vol. 6, No. 4, 1984, on pages 209 through 215, in the article "An integrated approach to CD-players" by J. Nijof, an optical scanning device which operates according to the triple-beam principle is described. The light beam generated by a laser is partitioned, by means of an optical diffraction grid, into a main beam, a +1 level diffracted beam and a −1 level diffracted beam. By means of an objective lens the three beams are focused onto an optical recording medium, for example, a compact disk, the medium reflects the main beam on to a four-quadrant photodetector and each of first level diffracted beams is diffracted onto a photodetector. The main beam reads the data from the recording medium while the first level diffracted beams serve for the tracking.

The invention is directed to an optical scanning system which provides precise tracking of a data track using a simple tracking regulator circuit in conjunction with a sinusoidal data track being utilized on the compact disc. The invention achieves this advantageous result in that the distance, on the recording medium, between the +1 level diffraction beam and the −1 level diffraction beam, which together generate the tracking error signal, is an odd integral multiple of one half the wavelength corresponding to the mean frequency of the sinusoidal data track.

BRIEF DESCRIPTION OF THE DRAWINGS

In FIG. 2 a sinusoidal, or wobbled, data track S on a recording medium CD is scanned using a main light beam L1. The tracking error signal is generated by a +1 level diffracted beam L2 and a −1 level diffracted beam L3. The diffracted beams L2 and L3 are spaced by a distance nT, which is equal to an odd integer multiple of one half the wavelength T corresponding to the frequency of the sinusoidal data track. The width of the data tracks is approximately μm while the amplitude of the sinusoidal data track is about 30 nm.

Figure 1:
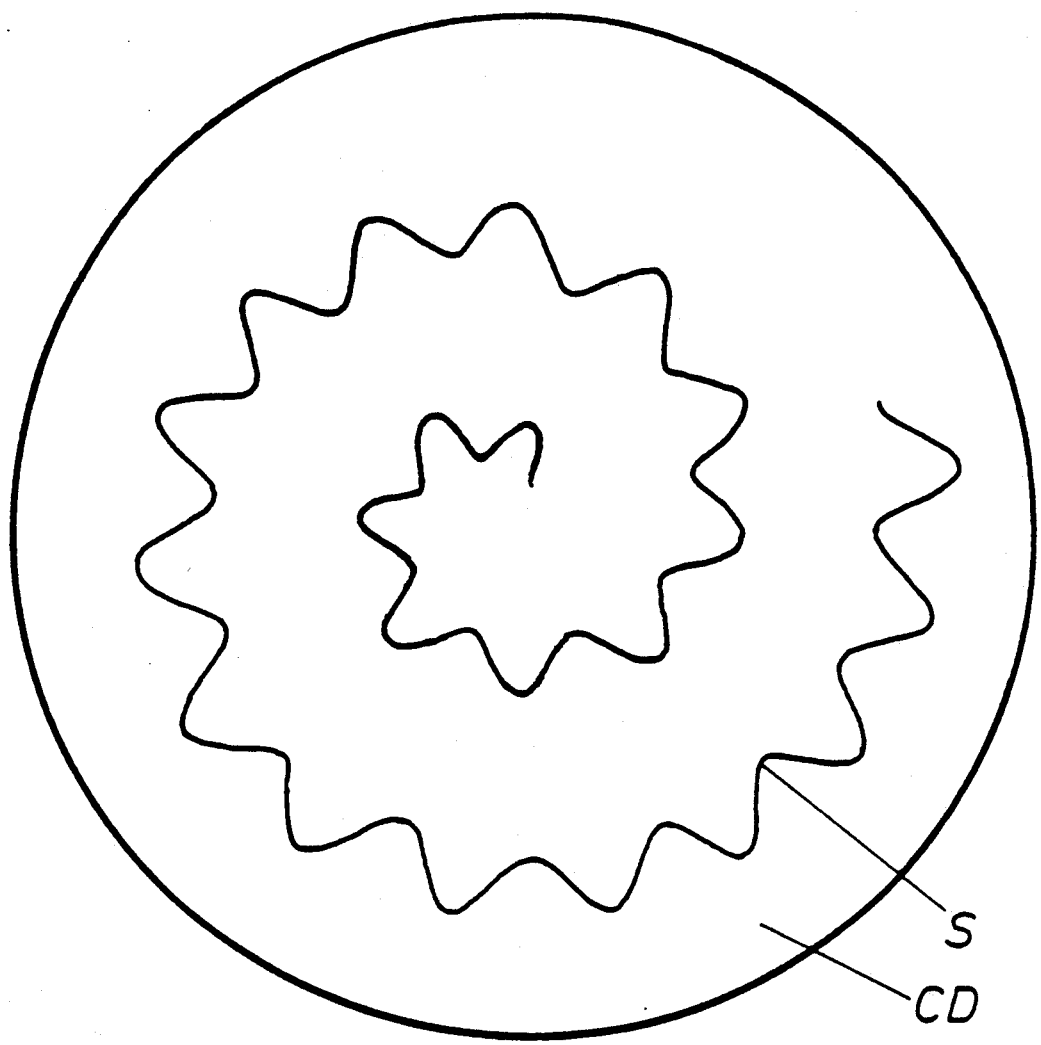
FIG. 1 shows a disc with a wobbled data track.
Figure 2:
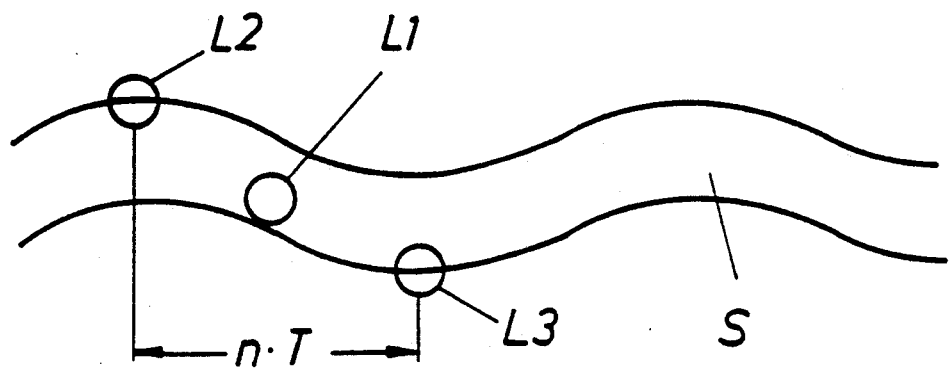
FIG. 2 shows the position of the light beams on the wobbled data track.

Because the spacing between the two diffracted beams L2 and L3 is an odd integer multiple of half the wavelength T of the sinusoidal track S, the light intensity of the reflected +1 level diffracted beam L2 changes equally and oppositely with the intensity of the −1 level diffracted beam L3. Accordingly, the tracking error signal, which is generated from the L2 and L3 beams reflected from the recording medium, is not modulated by the sinusoidal data track. Consequently, any disturbances caused by the wobbling of the data track do not appear in the tracking regulator circuit, and the tracking regulator circuit can be constructed as simply as for a recording medium without a sinusoidal data track and the complexity of the tracking regulator circuit is substantially reduced.

We claim:

1. In an optical scanning system including a compact disc having a sinusoidal data track meandering radially about the axis of rotation of said disc at a selected frequency, said optical scanning system also including means for generating a laser beam for reading data from said data track and first and second diffracted laser beams respectively tracking the opposite edges of said data track and generating a tracking error signal, an improvement wherein said first and second diffracted laser beams are separated, with respect to said disc, by a distance equal to an odd integer multiple of one half the wavelength corresponding to said selected frequency.

* * * * *